(12) United States Patent
Argyropaidas et al.

(10) Patent No.: US 12,515,390 B2
(45) Date of Patent: Jan. 6, 2026

(54) OPTIMISED FIBRE REINFORCED FILMS

(71) Applicant: MEGA PLAST INDUSTRIAL—EXPORTING S.A., Heraklion (GR)

(72) Inventors: Ioannis Argyropaidas, Attica (GR); Anthony Karandinos, Attica (GR); Georgia Tsoukleri, Attica (GR)

(73) Assignee: Mega Plast Industrial—Exporting S.A., Heraklion (GR)

( * ) Notice: Subject to any disclaimer, the term of this patent is extended or adjusted under 35 U.S.C. 154(b) by 210 days.

(21) Appl. No.: 18/017,141

(22) PCT Filed: Jul. 19, 2021

(86) PCT No.: PCT/EP2021/070180
§ 371 (c)(1),
(2) Date: Jan. 20, 2023

(87) PCT Pub. No.: WO2022/018044
PCT Pub. Date: Jan. 27, 2022

(65) Prior Publication Data
US 2024/0033987 A1    Feb. 1, 2024

(30) Foreign Application Priority Data
Jul. 20, 2020 (GB) ..................... 2011214

(51) Int. Cl.
*B29C 48/156* (2019.01)
*B29C 48/08* (2019.01)
(Continued)

(52) U.S. Cl.
CPC ........... *B29C 48/156* (2019.02); *B29C 48/08* (2019.02); *B29C 48/20* (2019.02); *B29K 2023/00* (2013.01); *B29K 2995/0081* (2013.01)

(58) Field of Classification Search
CPC ........... B29D 7/01; B29C 48/05; B29C 48/08; B29C 48/20
See application file for complete search history.

(56) References Cited

U.S. PATENT DOCUMENTS

| 3,844,867 A | 10/1974 | Regipa |
| 4,536,362 A | 8/1985 | Donaldson |

(Continued)

FOREIGN PATENT DOCUMENTS

| EP | 0923866 A1 | 6/1999 |
| EP | 1084204 B1 | 6/2003 |

(Continued)

OTHER PUBLICATIONS

International Preliminary Report on Patentability issued on Jan. 24, 2023 in PCT/EP2021/070180. 8 pages.

(Continued)

*Primary Examiner* — Alicia J Weydemeyer
(74) *Attorney, Agent, or Firm* — Meunier Carlin & Curfman LLC

(57) ABSTRACT

The present invention relates to a reinforced thermoplastic film comprising a base film wherein the base film comprises a stretchable polyolefin material comprising one or more layers and a plurality of extruded reinforcing fibre elements. The extruded reinforcing fibre elements are located on at least one surface of the base film and form fibre protrusions relative to the surface plane of the base film. At the location where each reinforcing fibre element is provided on the base film, an interface is formed comprising direct interactions between a base film domain and a protrusion domain. The base film domain is a domain of pure base film material and the protrusion domain is a domain of pure reinforcing fibre element material. The interface between the base film domain and the protrusion domain is interrupted by one or more discrete intermixed domains, wherein the intermixed (Continued)

domains comprise a material mixture comprising the base film material and the reinforcing fibre element material. The one or more intermixed domains partially interrupt the direct interactions at the interface between the base film domain and the protrusion domain. Furthermore, the one or more intermixed domains have interfaces and direct interactions with the base film and protrusion domains. The average thickness of the base film is less than the average thickness of the fibre protrusion. The films of the invention have controllable physical and mechanical properties such as tensile strength, elongation at break, tear resistance, coefficient of friction and adhesion.

24 Claims, 8 Drawing Sheets

(51) Int. Cl.
  *B29C 48/20* (2019.01)
  *B29K 23/00* (2006.01)

(56) References Cited

U.S. PATENT DOCUMENTS

| | | | |
|---|---|---|---|
| 5,080,957 | A | 1/1992 | Leseman et al. |
| 5,173,141 | A | 12/1992 | Leseman et al. |
| 6,969,548 | B1 | 11/2005 | Goldfine |
| 2001/0016245 | A1 | 8/2001 | Tuman et al. |
| 2004/0178544 | A1 | 9/2004 | Jackson et al. |
| 2005/0175805 | A1 | 8/2005 | Hild et al. |
| 2010/0075103 | A1* | 3/2010 | Miyamoto .............. B32B 3/28 156/244.11 |
| 2012/0288669 | A1* | 11/2012 | Gatos .................... B29C 48/10 428/221 |

FOREIGN PATENT DOCUMENTS

| | | |
|---|---|---|
| EP | 3160728 A | 5/2017 |
| EP | 3640018 A1 | 4/2020 |
| WO | 2005021240 A1 | 3/2005 |
| WO | 2011026954 A2 | 3/2011 |

OTHER PUBLICATIONS

Examination Report issued on Dec. 18, 2024, in European Application No. 21740590.1.
International Search Report and Written Opinion received in PCT/EP2021/070180, mailed Oct. 6, 2021, 13 pages.
Search Report received in GB2011214.0, dated Apr. 13, 2021, 2 pages.
Third Party Observation mailed on Mar. 27, 2025, in European Application No. 21740590.1.
Arthur J. Yu, "The Concept of Compatibility in Polyblends," Jun. 1, 1971, Multicomponent Polymer Systems, Chapter 1, pp. 2-14.
Ting Ge et al., "Structure and Strength at Immiscible Polymer Interfaces," Sep. 19, 2013, ACS Macro Letters, vol. 2, Issue 10.
Ting Ge et al., "Molecular Dynamics Simulations of Polymer Welding Strength from Interfacial Entanglements," Feb. 28, 2013, Phys. Rev. Lett., 110, 098301.
G.L. Jialanella, "Advances in Bonding Plastics," in Advances in Structural Adhesive Bonding, 2010, p. 243.
E.M. Petrie, "Adhesive Bonding of Textiles: Principles, Types of Adhesive, and Methods of Use," Joining Textiles, 2013, pp. 225, 240, 241.
W.D. Callister, Jr. & D.G. Rethwisch, "Materials Science and Engineering: An Introduction," 10th edition, 2018, pp. 572 & 578.
Wool, R.P. et al., "Welding of Polymer Interfaces", Polymer Engineering and Science, Mid-October, vol. 29, No. 19, pp. 1340-1367 (1989).
Third Party Observation mailed on Apr. 3, 2025, in European Application No. 21740590.1.
Third Party Observations in European Application No. 21740590.1, dated May 15, 2025.
Gierrepack Seal, Wrap, Protect: Fiber Film. Posted on Youtube.com on Jul. 20, 2018. accessed on-line: https://www.youtube.com/watch?v=B2xjHy8E798.
Third Party Observations in European Application No. 21740590.1, dated Jun. 6, 2025.
Examination Report in European Application No. 21740590.1, dated Jun. 3, 2025.
Notice of Deficiencies mailed on Jun. 29, 2025, in Israeli Application No. 300034.
Third Party Observation issued in European Application No. 21740590.1.
Third Party Observation mailed on Oct. 15, 2025, in European Application No. 21740590.1.
Third Party Observation mailed on Oct. 31, 2025, in European Application No. 21740590.1.
Third Party Observation mailed on Nov. 8, 2025, in European Application No. 21740590.1.
Atkins, "Intermittent bonding for high toughness/high strength composites", Journal of Materials Science, 10, 819-832 (1975).
Lei et al. "Interfacial Micromechanics in Fibrous Composites: Design, Evaluation, and Models", The Scientific World Journal, vol. 2014, Article ID 282436.
Tülümen et al. "Investigation of Feedstock Preparation for Injection Molding of Oxide-Oxide Ceramic Composites", Journal of Manufacturing and Materials Processing, 3, 9, (2019).
Zok "Developments in Oxide Fiber Composites", J. Am. Ceram. Soc., 89 [11], 3309-3324 (2006).

* cited by examiner

Low pressure

Intermediate pressure

High pressure

OPTIMISED FIBRE REINFORCED FILMS

FIELD OF THE INVENTION

This invention relates to a tear resistant reinforced stretchable film. In particular, the present invention is directed to a reinforced thin film with controllable physical and mechanical properties such as tensile strength, elongation at break, tear resistance, coefficient of friction and adhesion. Articles according to the present invention may be silage, stretch film, pre-stretched stretch film, hood film or mulch film, and can be produced by known methods of extrusion or coextrusion such as cast, blown and the like. The film is characterised by its significantly lower weight when compared to films known in the art with similar and/or improved physical and mechanical characteristics.

BACKGROUND OF THE INVENTION

Reinforced stretchable films are used for many applications. In the example of a stretch hood, as described in WO2006/076917 A1, the hood is formed from a biaxially oriented tubular film having a seam. In this application, the seam provides flexibility for adjusting the size of the hood but lacks the necessary structural reinforcement for use in demanding packaging applications. In the case of baling for age or hay, EP0923866 A1 discloses a stretch film imbued with a pest deterrent, which increases the cost and the weight of the product considerably.

Several cases are known in the art where the reinforcing phase is located in a specific layer, hence creating laminated structures in the film. In US2005/0175805 A1, a plurality of fibres is dispersed between two thermoplastic layers made during a blown process. This fibre-reinforced film, which is mainly formed into a bag, consists of an inner layer of randomly dispersed fibres. Accordingly, discontinuities in fibre volume fraction per unit length of film occur, causing uneven reinforcement across the film.

Co-extruded reinforced films for packaging have received increased attention over the last few years. U.S. Pat. No. 4,536,362 discloses a longitudinally ribbed plastic film formed by extrusion through a specially designed die head. Similarly, in WO2005/021240 A1 the longitudinally co-extruded thicker regions are designed to strengthen the film. These documents aimed to produce inexpensive reinforced packaging film but suffer from uncontrollable thickness fluctuations which elicit variations in physical properties within one material. Furthermore, the reinforcement is achieved by increasing the cross-section of sections in question (by thickening them), rather than by fundamentally enhancing the inherent properties of the material.

WO2011/026954 discloses a thermoplastic film comprising a stretchable layered base film and a plurality of extruded elements located on the base film which form protrusions away from the plane of the base film. The material behaviour of the region between the film and the reinforcing fibre element is such that a mixed layer, comprising fibre element and base film, exists between the opposing layers of film and element material. This film exhibits a range of beneficial physical properties, such as tensile strength and tear resistance, but at a fraction of the weight of other films then known in the art.

Reinforced extendible systems, with longitudinal reinforcing strips fastened to a film to increase the mechanical strength of the film in the longitudinal direction, are already available, even those with low weight. Such reinforced systems need a secure coupling between the base film and the reinforcing strips applied atop the base film. This adds additional processing steps during production and thus additional cost. An important feature of reinforced thermoplastic films is the strength of the link between the base film and any reinforcing elements. Strengthening of this link/bond can be achieved by coupling agents or process steps designed to enhance the quality of the final product.

In certain embodiments, where thin flexible packaging with enhanced tensile strength in the machine direction is needed, existing systems have proposed either single wide reinforcing strips or folded/overlapped reinforcing elements. These, however, cause significant increases in weight and can encourage debonding of the elements from the film.

The use of stretch films of polyethylene for packaging or unitising goods is known. For heavier applications, and depending on the weight and size of goods, films with different characteristics (strength, thickness, tack, slip) are used.

For a film manufacturer, the major cost comes from the use of polyethylene as a raw material. It is therefore understood that the cost of producing packaging increases in proportion to the thickness of the film produced. Therefore, it is useful to decrease the thickness of films used for packaging in order to reduce production costs.

Additionally, the volume and weight of waste material produced during the packaging or unitising of goods is also dependent on the thickness of the film. Thus, reducing film thickness in turn reduces the volume and weight of waste material.

The objective of the present invention is to overcome the problems mentioned above, providing a solution in the form of optimised reinforced stretch films.

SUMMARY OF THE INVENTION

In accordance with a first aspect of the invention there is provided a reinforced thermoplastic film comprising:
- a base film wherein the base film comprises a stretchable polyolefin material comprising one or more layers; and
- a plurality of extruded reinforcing fibre elements;
- wherein the extruded reinforcing fibre elements are located on at least one surface of the base film;
- wherein the extruded reinforcing fibre elements form fibre protrusions relative to the surface plane of the base film;
- wherein at the location where each reinforcing fibre element is provided on the base film, an interface is formed comprising direct interactions between a base film domain and a protrusion domain;
- wherein the base film domain is a domain of pure base film material and the protrusion domain is a domain of pure reinforcing fibre element material;
- wherein the interface between the base film domain and the protrusion domain is interrupted by one or more discrete intermixed domains; wherein the intermixed domains comprise a material mixture comprising the base film material and the reinforcing fibre element material and wherein the one or more intermixed domains partially interrupt the direct interactions at the interface between the base film domain and the protrusion domain;
- wherein the one or more intermixed domains have interfaces and direct interactions with the base and protrusion domains;
- and
- wherein the average thickness of the base film is less than the average thickness of the fibre protrusion.

In accordance with a second aspect of the invention there is provided a method of producing a thermoplastic film according to the first aspect of the invention.

In accordance with a third aspect of the invention there is provided a use of a thermoplastic film according to the first aspect of the invention or of a product of the second aspect of the invention for packaging, silage applications, manual packing applications and mulch applications.

In accordance with a fourth aspect of the invention there is provided a thermoplastic film obtainable from a method of producing a thermoplastic film.

The reinforced stretch film of the present invention is particularly suitable for unitisation of goods, e.g., packages, bales, silage or plants bearing sharp edges. It is also suitable for use in mulching, for example on arable land to suppress weeds and conserve water in crop production and landscaping. The reinforced stretch film of the present invention is particularly suitable for use as a silage film or a net replacement in silage applications, for example in wrapping bales.

It is beneficial that a reinforced stretch film resists tearing or catastrophic breakage during wrapping or when the film is gathered from the soil following use as a plastic mulch. The geometrical features of the fibre protrusion of the reinforcing fibre element as well as the shape and the distribution of the domain of material mixture as defined in the present invention improve the tear resistance of the film during stretching or under stretched state conditions. The degree of tear resistance can be tailored to meet the different requirements of the end film, which vary depending on intended use. The propagation of tears across the film is inhibited and delayed by the reinforcing fibre elements, which allows the wrapping process to continue. Hence, the integrity of the reinforced stretch film and its packaging ability are maintained without interrupting the packaging procedure. For hand-wrapping the end user cuts said reinforced stretch film by hand after finishing the unitization of the goods. Similarly, for automated wrapping lines the film is cut at its edge by a suitable knife. Accordingly, the reinforced stretch film and more specifically the reinforcing fibre elements disposed thereon are not too strong, lest automated or manual cutting of the film be hindered.

A major limitation to the commercial uses of plastic film mulches is their disposal. Removal of the film from the field is time-consuming, requiring about 16 hours per hectare, which increases significantly if the film breaks into pieces during removal. If pieces of plastic mulch film are left behind in the field, having broken away from the main sheet during removal of the mulch, this can interfere with the root development of the subsequent crop. Normally the useful life of plastic mulching exceeds the duration of crop cycles and therefore plastic film mulches require disposal at the end of the season. The production and disposal of such plastic mulches entail significant environmental costs. The reinforced stretch film of the present invention resists tearing and is designed to significantly facilitate the removal of plastic film mulches and thereby reduce soil contamination.

The present invention provides the abovementioned characteristics while minimising overall material usage and cost. The reinforced fibre stretch film can be thin, and the one or more reinforcing fibre elements are as effective as possible at a low overall weight. These aspects have significant additional benefits in terms of environmental and recycling issues.

BRIEF DESCRIPTION OF THE DRAWINGS

Further features and advantages of the reinforced stretch film according to the present invention become apparent from the illustrative description of exemplary embodiments thereof taken in conjunction with the accompanying drawings, wherein.

Figure 1:
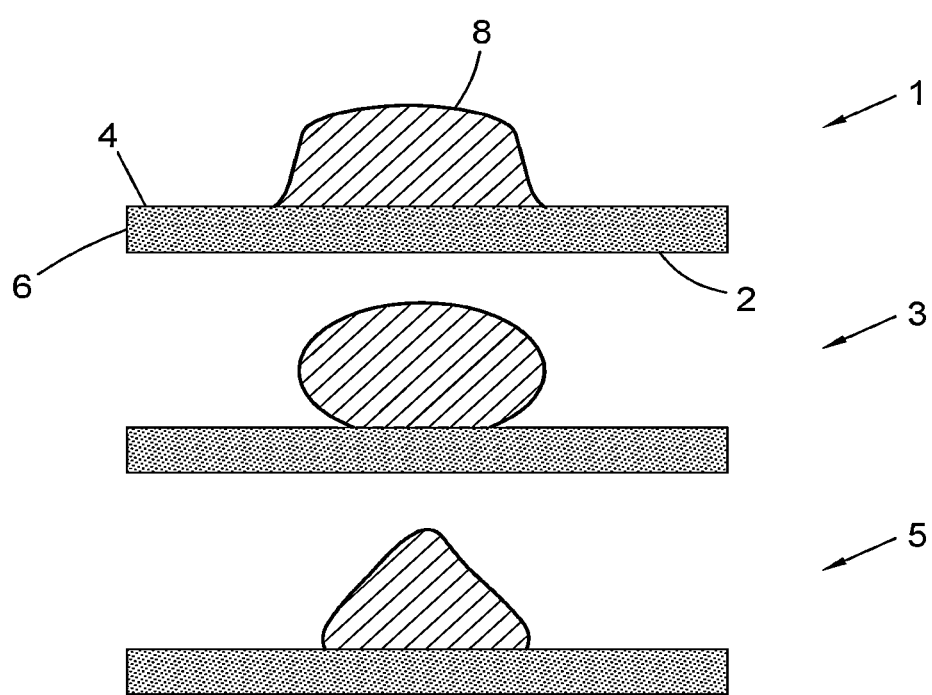
FIG. 1 shows indicative shapes of fibre protrusions formed by reinforcing fibre elements on base films according to the present invention.

It is noted that the figures are not drawn to scale and represent only schematic illustrations of systems. They do not represent the actual proportions of objects according to the present invention.

DETAILED DESCRIPTION OF THE INVENTION

All preferred embodiments and features according to the present invention should be considered as disclosed in combination with other preferred embodiments and features of the invention.

The preferred features and values below are generally given with respect to each individual fibre element. However, these values are equally applicable across the plurality of fibre elements, where they then may refer to the mean average value for the feature referenced.

In the present invention, a plurality of extruded reinforcing fibre elements is disposed on at least one surface of the base film. The extruded reinforcing fibre elements form fibre protrusions relative to the surface plane of the base film. Each fibre protrusion comprises a protrusion domain (PD) of pure fibre element material. At the location where each reinforcing fibre element is disposed on the base film, i.e., below the fibre protrusion, the base film comprises a base film domain (BD) of pure base film material.

The base film domain is generally underneath the fibre protrusion domain.

An interface is formed between the domain of pure base film material and the domain of pure reinforcing fibre element material at the location where each reinforcing fibre element is located on the base film. The interface comprises direct interaction between the base film and fibre protrusion domains. This direct interaction is interrupted by one or more domains of material mixture comprising the base film material and the fibre element material. These domains may be referred to as intermixed domains. The intermixed domains (ID) comprise a material mixture comprising the base film material and the reinforcing fibre element material. Such intermixed domains form following the transfer of material from the protrusion domain of pure fibre element material and from the base film domain of pure base film material. The interaction between the PD and BD domains means that the interfacial mixing is not continuous and complete across the interface formed between the domain of pure base film material and the domain of pure reinforcing fibre element material—in other words, the interfacial mixing is discontinuous. The interface between the domain of pure base film material and the domain of pure reinforcing fibre element material may thus be referred to as "discontinuous".

The intermixed domains are discrete in the sense that they form individual domains and do not extend along the entire length of the interface formed between the domain of pure base film material and the domain of pure reinforcing fibre element material. The one or more intermixed domains have their own interfaces and direct interaction with both the base film and fibre protrusion domains.

There may be more than one domain of intermixed material across the discontinuous interface formed between the domain of pure base film material and the domain of pure reinforcing fibre element material. For instance, there may be two, three, four, five or more than five discrete intermixed domains at the interface between the protrusion and base film domains.

The present invention addresses shortcomings with the prior art. When reinforcing fibre elements are freshly extruded and deposited onto a base film, extensive heat may be transferred from the reinforcing fibre element to the base film. The use of heat is necessary because, in combination with applied pressure, it ensures good wetting of the surface of the fibre element and the surface of the base film. However, if the heat transfer is extensive, the heat (along with the applied pressure) can create edge defects. These may locally weaken the reinforced fibre film. Tear propagation may then be initiated at this point, leading to catastrophic failure of the product. On the other hand, if there is not enough heat or pressure, delamination of the fibre protrusion and the base film may occur. The tear might then propagate underneath the fibre protrusion causing again catastrophic breakage of the film. Therefore, the effective welding of fibre protrusion to the base film requires controlled use of heat and pressure. This results in discontinuous interfacial mixing and formation of the interfaces discussed above.

In more detail, between the fibre protrusion and base film domains, an interface is formed, where the interface comprises direct interactions between the base film domain and fibre protrusion domain. The interface comprises on the one side pure fibre protrusion material and on the other side pure base film material. The interface between pure reinforcing fibre element material and pure base film material is intermittently interrupted by one or more discrete domains, otherwise referred to as intermixed domains. These domains interrupt the direct interaction of the fibre protrusion and base film domains at these locations. The intermixed domains comprise both reinforcing fibre element material and base film material as a result of material transfer from the BD and PD domains through the interface.

Preferably, the intermixed domains are located away from the perimeter of the fibre protrusion, i.e., away from the outer edge contact points, C1 and C2. The intermixed material domains are preferably located towards the interior of each fibre protrusion.

The intermixed domain boundaries are surrounded by pure reinforcing fibre element material and pure base film material. In other words, the intermixed domains form interfaces with both the protrusion domain and the base film domain.

The size, number, and shape of each intermixed domain depends on the reinforcing fibre element material and base film material compatibility, applied temperature, applied pressure, reinforcing fibre element mass, base film thickness, extrusion speed etc. These factors can all be varied to arrive at the desired degree of intermixing within the intermixed domain.

The reinforced thermoplastic film of the invention may comprise further domains of intermixed material which are not located at the interface between the fibre protrusion and base film domains. The boundaries of these intermixed domains may thus be totally surrounded by pure base film material or pure reinforcing fibre element material.

Figure 2:
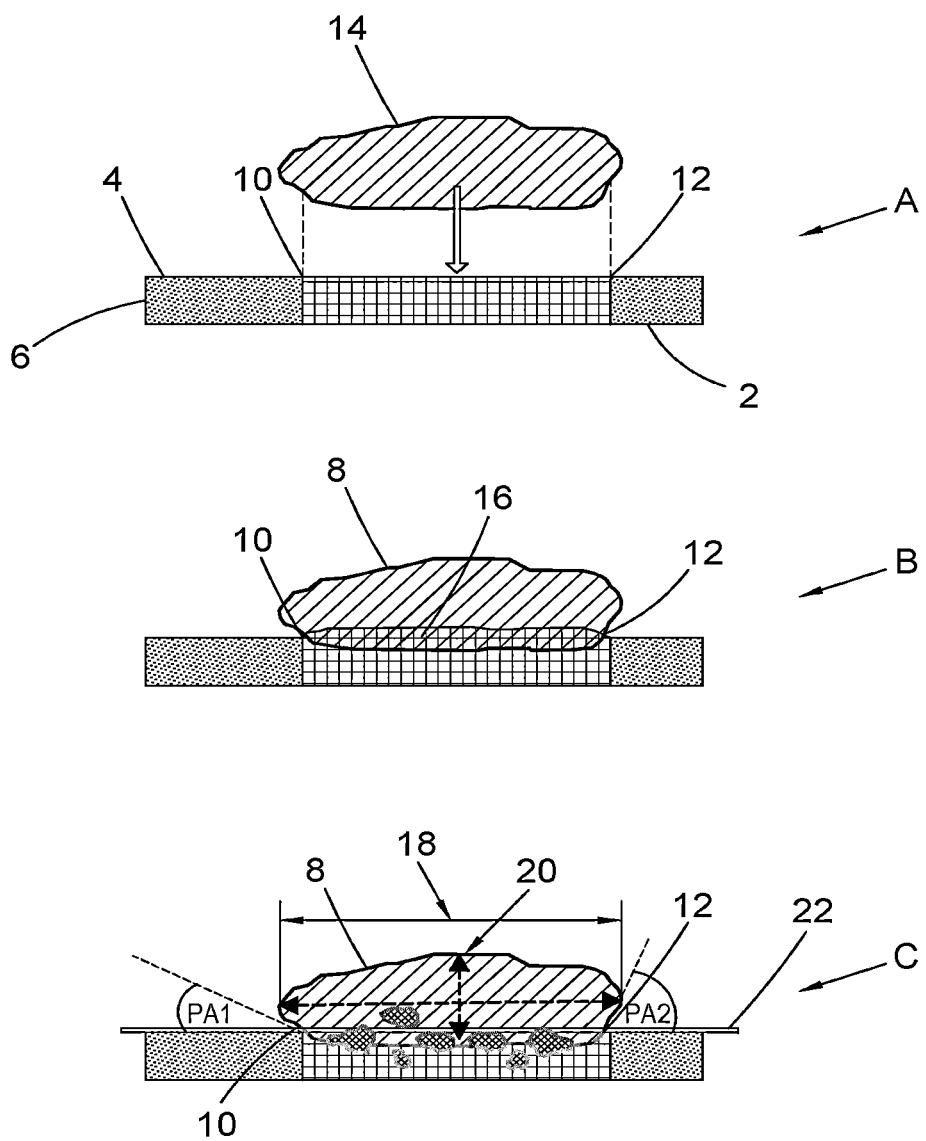
FIG. 2 shows a schematic diagram of the relationship between reinforcing fibre element, fibre protrusion and the base film, emphasising the physical parameters relevant to the present invention and the domain types present at the interface.

The location of the various domains can be seen for example in FIG. 2. Underneath the fibre protrusion is identified a contact plane, defined as the plane formed between the outer edge contact points C1 and C2 extending laterally relative to the fibre protrusion. The cross-sectional planes are the planes perpendicular to the contact plane passing through the points C1 and C2 and orthogonally crossing the base film.

The extruded base film is the film used as a base, onto which to the extruded reinforcing fibre elements are placed.

The intermixed domains are located in such a way to prevent pure reinforcing fibre element material and pure base film material from coming into contact at certain locations across the discontinuous interface.

Preferably, in the vicinity of the outer edge contact points (C1 and C2) there is direct contact of pure base film material and pure reinforcing fibre element material.

Thus, in a typical film of the invention, there is generally a bottom layer of base film material, a top layer of reinforcing fibre element material, and a discontinuous interface between the top and bottom layers. The areas or regions of interfacial mixing may be targeted to certain locations across the interface, e.g., to the interior or central portion of the fibre protrusion, away from the boundaries of the contact between the reinforcing fibre element and the base film.

A portion of each reinforcing fibre or reinforcing fibre-like element material forms an interfacial mixture with the base film material. Preferably, less than 50%, more preferably less than 20%, most preferably less than 10% by weight on average of each reinforcing fibre or reinforcing fibre-like element material forms an interfacial mixture with the base film material. This ensures good mixing of the polymeric materials, hence good bond strength of the reinforcing fibre elements to the base film. This yields high tear resistances compared to base films in which strengthening elements are mounted or bonded to their surface, for example, by adhesive.

Preferably, more than 30% of the maximum height of the reinforcing fibre element (measured before the element is applied to the base film) protrudes above the film surface, more preferably more than 50% and most preferably more than 80% of the maximum height is retained/remained.

The reinforced thermoplastic film preferably has a weight of between 4.0 g/m$^2$ and 100.0 g/m$^2$, more preferably 6.0 g/m$^2$ and 60.0 g/m$^2$, most preferably 10.0 g/m$^2$ and 20.0 g/m$^2$.

Preferably, the reinforcing fibre elements of the reinforced thermoplastic film of the present invention have a weight in total which is less than 50% the weight of said base film, or more preferably less than 30% the weight of said base film, or most preferably less than 20% the weight of said base film. Said reinforcing fibre elements preferably have a basis weight of less than 1 g/cm², more preferably less than 0.1 g/cm², most preferably less than 0.01 g/cm².

A contact plane may be defined as the plane connecting the outer edge contact points C1 and C2. These points reside on the boundary of contact between the reinforcing fibre element and the base film. The one or more domains of intermixed material may be formed above, below or crossing the contact plane.

The number and size of the intermixed domains (i.e., the amount of interfacial mixing) can be controlled by varying the temperature and/or pressure at which the reinforcing fibre elements are applied to the base film. Other factors which can be varied include the reinforcing fibre element mass, base film thickness and extrusion speed, and so on.

For example, the magnitude of the compression of the reinforcing fibre element onto the base film, and time of compression, can both be controlled in order to arrive at specified degrees of interfacial mixing across the interface between the protrusion and base film domains. These variables can also be used to control the height and/or width of the fibre protrusion.

Alternatively, where the magnitude of compression of the reinforcing fibre element onto the base film is low, such that the pressure is low, this may result in a greater maximum height of the fibre protrusion ($H_{prot\_max}$) and the presence of discrete domains of interfacial mixing of the materials from the base film and reinforcing fibre element, respectively.

The amount of interfacial mixing can be controlled along the interface with the maximum height and/or maximum width of the fibre protrusion, in order to optimise the strength of the film. This control can lead to unexpected improvements in tear energy and tensile properties.

The plurality of reinforcing fibre elements comprises at least three reinforcing fibre elements which are configured to reinforce the base film. Each element forms its own individual protrusion domains with the base film.

The interface of each fibre protrusion with the base film is typically curved. In other words, when the film is viewed through its cross-section (alternatively referred to as the vertical dimension, z), a curved interface is formed between the fibre protrusion and the base film.

The base film under the fibre protrusion comprises a top (interfacial surface) and bottom surface where either may deflect (or bend) in the vertical dimension z following the curvature of the interface.

The localised bending may be due to the contact and bonding of the one or more reinforcing fibre elements with the base film and the formation of domains. The way in which one or more reinforcing fibre elements interact with the base film and the distribution of the intermixed domains are important. The degree of the curvature, the level of base film-reinforcing fibre element material mixing, the extent of intermixing, the maximum height, the maximum width, and the angle of the fibre protrusion can be controlled to give optimal strength to the stretch film.

The means by which the plurality of reinforcing elements interact with the base film and the shape of the interface formed between the outer edge contact points C1 and C2 of the fibre protrusion formed on the base film are important. The degree of curvature, the extent to which the fibre protrusion and base film materials intermix, and the height of the fibre protrusion can be controlled and refined in order to enhance the physical and mechanical properties (e.g., strength, resistance to tearing) of the optimised reinforced thermoplastic film.

In the invention, extruded reinforcing fibre elements are fibres which are extruded and placed on the top of the surface of the base film to provide resistance to tear propagation. The reinforcing constituents are fibres or fibre-like elements. "Reinforcing Fibre" or "reinforcing fibre-like" has the meaning of being elongated elements wherein the cross section of the element has a width in the same order of magnitude in comparison to the height of the element.

The terms "Reinforcing fibre" and "reinforcing fibre-like" are interchangeable as used herein.

The plurality of reinforcing fibre elements of a reinforcing fibre element material is configured to reinforce the base film, wherein the reinforcing fibre elements are provided at least on one surface of the base film and form an elevated area of material on at least one surface of the base film, which forms the "fibre protrusion". The maximum height and maximum width of the fibre protrusion, and the ratio of the maximum height to maximum width, are all important.

When dimensions are referenced herein, they may apply to each individual reinforcing fibre element or fibre protrusion, the reinforcing fibre elements or fibre protrusions as a whole, or alternatively, be the mean average dimension for all the reinforcing elements or fibre protrusions across the film.

The fibre protrusions extend above the plane of contact formed between the two outer contact points C1 and C2 typically by more than 60 μm, preferably by more than 100 μm, more preferably by more than 140 μm, most preferably by more than 200 μm. This dimension may alternatively be referred to as the height maximum ($H_{prot\_max}$) of the fibre protrusion, being the maximum straight-line distance extending from the distalmost point of the fibre protrusion to the contact plane, the straight line being perpendicular to the plane of the contact. The contact plane connects in straight lines the two outer edge points of contact between fibre protrusion and base film. $H_{prot\_max}$ is preferably in the range 60 μm to 200 μm and is most preferably in the range 100 μm to 180 μm.

The width of the fibre protrusions is generally less than 1000 μm, more preferably less than 600 μm, most preferably less than 350 μm. The width maximum ($W_{prot\_max}$) of the fibre protrusion is the maximum width of a fibre protrusion from one side to the other, said measurement running parallel to the plane of contact. $W_{prot\_max}$ is preferably in the range 200 to 260 μm and is most preferably in the range 200 to 240 μm.

The contact width is the distance as measured from the outer edge contact point C1 to the outer edge contact point C2 along the contact plane, i.e., in a cross-section of the protrusion and lying perpendicular to the height of the protrusion.

The fibre protrusions preferably have a contact width of less than 1100 μm, preferably less than 700 μm, more preferably less than 400 μm.

The ratio of the height to the width of the reinforcing fibre elements prior to application to the base film may be in the range 3:1 to 1:3, more preferably in the range 2:1 to 1:2, more preferably in the range 1.5:1 to 1:1.5, such as in the range of about 1:1. This ratio may change after the reinforcing fibre elements are applied to the base film. The ratio of the largest axis to the smallest axis of the cross-section of the reinforcing fibre elements may be less than 3:1, more less than 2:1, more preferably less than 1.5:1, such as about 1:1. The ratios expressed herein are in the form x:y, which denotes x-to-y, i.e. that for x items, there are y items. For example, a height-to-width ratio of 1:4 denotes that each 1 unit of height is accompanied by 4 units of width, hence the value of height is 25% of the value of width. This percentage can also be expressed in decimal or fractional form, such that 1:4=25%=0.25. This geometry distinguishes the reinforcing fibre or reinforcing fibre-like elements for example from strips, bands, ribbons or tapes as reinforcement elements, which have a large width in comparison to the height of the strip. The advantage of such a reinforcing fibre or reinforcing fibre-like geometry is the smaller material consumption for a given height, and more tuneable properties of the resultant materials. Said reinforcing fibre or reinforcing fibre-like elements are distinguished from dots or spots.

Preferably, after application to the base film, the height of the fibre protrusion is substantially of the same size as its width, although generally the height is slightly less than the width. In some embodiments, where the reinforcing fibre element has been deposited and bonded to the base film, the fibre protrusions preferably have a ratio of maximum height from the plane of contact to maximum width of more than 0.1, preferably more than 0.2, more preferably of more than 0.33, still more preferably of more than 0.4 or 0.5, even more preferably of more than 0.6 and most preferably of more than 0.80, or even more than 1.0.

For a particular element, the ratio $H_{prot\_max}/W_{prot\_max}$ is preferably in the range 0.60 to 1.00, preferably in the range 0.65 to 0.90, most preferably in the range 0.70 to 0.80. This results in fibre protrusions which are taller and narrower than those reported previously.

The fibre protrusions do not cover the entirety of the film, instead the percentage of the surface area of the film covered is generally below 51%, or below 45%, more preferably below 40%, most preferably below 35%.

The diameter of the reinforcing fibre elements is preferably between 30 µm and 1000 µm, more preferably between 50 µm and 500 µm, most preferably between 100 µm and 350 µm. The maximum average diameter of the reinforcing fibre elements may vary by no more than 75%, preferably by no more than 50%, more preferably by no more than 25%, most preferably by no more than 10%, from the minimum average diameter of the reinforcing fibre elements.

The ratio of the average height to the average length of said reinforcing fibre element of the current invention is in the range of 1:500 to 1:10000000, preferably in the range 1:1000 to 1:1000000, most preferably in the range 1:10000 to 1:100000.

Preferably, where an extrusion process is used to form the reinforcing fibres or reinforcing fibre-like elements, the reinforcing fibres or reinforcing fibre-like elements have a substantially circular cross-section. This cross-section may become more oval in cross-section as the reinforcing fibre element s are applied to the base film. Thus, preferably the reinforcing fibre elements have a substantially circular cross section prior to application to the base film. In contrast, once the reinforcing fibre element has been applied to the base film, particularly where pressure has been applied to it, the fibre protrusion preferably has a more oval or elliptical cross-section. Such fibre protrusions may even have an eye shaped cross-section. Typical fibre protrusion shapes are shown in FIG. 1.

The protrusion angle is the supplementary angle of the angle formed between the tangent to the fibre protrusion and the plane of contact at the outer edge contact point. The outer edge contact points are the two points where the reinforcing fibre element makes contact with the upper or lower surface of the base film. The tangent touches the outline of the fibre protrusion at one point and crosses the plane of contact at the outer edge contact point. The contact plane is defined as the plane which connects the outer edge contact points C1 and C2 and is located under the fibre protrusion. C1 and C2 are connected by a straight line.

The protrusion angle is then calculated by subtracting the supplementary angle from 180 degrees. In practice, it is often this measurement which is taken when seeking to measure a protrusion angle, as this can be measured by using standard optical techniques.

There are two protrusion angles, PA1 and PA2 (as illustrated in the FIG. 2), which refer to the supplementary angles of the angles formed on either side of the fibre protrusion when viewed along its cross-section. The two protrusion angles either side of the element are not necessarily the same. This may also correspond to a different degree of interfacial mixing at each side of the element. The angle may relate to the degree of penetration of reinforcing fibre element material into the base film material, i.e., the degree of interfacial mixing. A smaller angle may indicate less intermixing, but the fibre protrusion may provide a larger barrier to tear propagation. Large angles may indicate a shallower fibre protrusion, which may have more interfacial mixing below it.

Each protrusion angle is preferably independently selected from a value in the range 10 degrees to 170 degrees, more preferably in the range 40 degrees to 140 degrees, more preferably in the range 60 degrees to 120 degrees, most preferably around 90 degrees. In a preferred embodiment, the protrusion angles PA1 and PA2 are substantially identical, i.e., the sides of the fibre protrusion are preferably symmetrical.

In a preferred embodiment, the difference between the two protrusion angles PA1 and PA2 of each fibre protrusion is less than 90 degrees, preferably less than 60 degrees, more preferably less than 30 degrees, most preferably less than 10 degrees.

The cross-sectional shape of the reinforcing fibre element is important. After the deposition of the reinforcing fibre elements on the base film the interface formed between the fibre protrusion domain and the base film domain is typically curved, preferably convex or concave.

The reinforcing fibre elements may be positioned straight, curved, waved, zigzag, spiral, in the form of circles or can take any other configuration or contour.

Mixtures of reinforcing fibre element cross-sectional shapes may also be used. The related cross-sectional shapes of the reinforcing fibre elements have in practice, obtuse, trimmed, and rounded edges. The cross-sectional area may vary along the fibre protrusion, for example by altering the draw-ratio of the reinforcing fibre element during a continuous deposition process alters the deposited fibre mass. Round or oval cross sections are preferable. The cross-sectional shape of the reinforcing fibre elements may change before and after their positioning on the base film. In other embodiments the cross-sectional shape of the fibre protrusion is round, square, elliptical, rectangular or lenticular.

The cross-sectional shape may vary over the length of the fibre protrusion. Processing of the reinforcing fibre elements can give extra performance to the final article.

The reinforced stretch film of the present invention comprises a base film which is preferably an extruded mono or multilayered stretchable or pre-stretched film. The thermoplastic film of the current invention is reinforced with fibre elements which are applied to the film and form fibre protrusions once applied. The result is controllable properties such as, tensile strength, elongation at break, tear resistance, coefficient of friction and weight per square metre, through the tuneable properties of the fibre protrusion. Such a reinforced thermoplastic film is ideally suited for use in pallet and food wrapping, product unitization, baling hay and barrier film, and agricultural applications such as mulching. Said thermoplastic film preferably does not apply to any garment or disposable garment applications.

The base film and the reinforcing fibre elements may be pre-stretched by at least 10%, preferably by at least 50%, more preferably by at least 100%, most preferably by at least 200%.

The base film may be perforated or non-perforated. The lateral edges of the base film may be hemmed or unhemmed.

The base film may comprise polyethylene, polypropylene, polyisobutylene, polybutyl-1-ene, poly-4-methylpent-1-ene, polyisoprene, polybutadiene and/or mixtures and copolymers thereof. Preferably the base film comprises ethylene-based polymers.

The said base film is preferably not an elastic non-woven or spun-bonded type.

When the base film is a multilayer film it may be multilayer symmetrical, for example, ABCBA structure or asymmetrical, for example ABCDE structure, which are further described in WO2011/026954.

In the invention, the base film may have an ABC, ABA, ABCBA or ABCDE structure, wherein ABCDE are layers having different compositions and/or thicknesses, with the exception that layer D may be the same as layer B.

For the above ABC layer structure, the layer A is preferably a slip layer, the layer B is preferably a core layer, and the layer C is preferably a cling layer. For the above ABCDE layer structure, the layer A is preferably a slip layer, the layer B is preferably an intermediate layer, and the layer C is preferably a core layer, layer D is an intermediate layer and layer E is preferably a cling layer.

The core layer of the base film may comprise polypropylene and other polymers.

As used herein, "a different type of layer" is used to denote one or more different chemical or physical characteristic of the layer selected from the group including thickness, density, melt index, chemical composition, polymer type, major melting peak, crystallisation temperature, and the like.

Preferably, the reinforced thermoplastic film of the present invention comprises a base film which is an extruded multilayered stretchable or pre-stretched film. The base film may have 3+2n layers, where n is a natural number such as 0, 1, 2, 3, 4 and so on. Preferably, the base film has 3, 5, 7, 9, 11, 15, 17, 19, 21, 23, 25 or 27 layers, more preferably 3, 5 or 7 layers, more preferably 3 or 5 layers, most preferably 5 layers.

Preferably, the base film has a symmetrical (ABA for a three-layer film; ABCBA for a five-layer film) structure, wherein each of A, B and C represent a different type of layer in the multilayer film. Preferably the stack of the multilayer is symmetric with regards to the central layer.

A further preferred base film is one having a three-layer asymmetric structure (for example ABC), wherein each of A, B and C represent a different type of layer in the film.

A further preferred base film is one having a five-layer asymmetric structure (for example ABCDE), wherein each of A, B, C, D and E represent a different type of layer in the film. In the ABCDE structure, layers B and D may be made of the same composition and/or be of the same thickness.

For the above ABCDE layer structure, B, C and D can comprise nanolayers. The technology of producing nanolayers is described in more detail in US2009/0104424.

Preferably, the fibres of the present invention (which may be used in any of the embodiments or aspects disclosed herein) comprise or consist of co-extruded fibres. The fibres of the present invention are preferably bi-component fibres having a shell/core structure, which are further described in WO2011/026954.

The deposited fibre elements may possess slip characteristics in order to compensate for the tacking characteristics of the base film. In one embodiment the tacking characteristics denote the tacking of the material when it is in contact with itself. The slip characteristic of the fibre elements facilitates the unwinding of the film from its roll more easily.

Preferably, the width of said base film is less than or equal to 1500 mm, preferably is less than or equal to 1000 mm, more preferably is less than or equal to 750 mm, most preferably is less than or equal to 500 mm.

Preferably, the reinforced thermoplastic film of the present invention comprises a base film which is an extruded multilayered stretchable or pre-stretched film. These are further described in our previous patent publication WO2011/026954. The reinforcing fibre elements and the base film materials may comprise polymers or copolymers, preferably synthetic polymers. Preferably the polymers are polyolefins or non-polyolefins such as polyamides or polyesters. Mixtures of different polyolefins or mixtures of polyolefins with non-polyolefins can also be used. In an embodiment, the base film and/or the fibre elements comprise polypropylene.

Where the base film and the fibre elements are made from the same chemical material, the physical attributes of the base film and the fibre elements may differ.

The film of the present invention may be produced by cast and blown extrusion methods, which are further described in WO2011/026954.

The reinforcing fibre elements are preferably bonded onto the base film through heat fusion. During deposition, the reinforcing fibre elements are generally at a temperature higher than room temperature and close to their crystallisation range, that is, preferably 1-100° C. above their crystallisation point, more preferably 1-80° C., more preferably 10-60° C., more preferably 20-50° C. The crystallisation point may be determined by means of Differential Scanning calorimetry with a heating rate of 10° C./min.

During the process, the base film material and the reinforcing fibre element material form a connection on a molecular level and are interpenetrated at the interface between the pure base film material and the pure reinforcing fibre element material. Thus, at the location where the reinforcing fibre elements are provided on the base film, a discontinuous interface is formed between pure reinforcing fibre element material and pure base film material. Along this interface, one or more domains of a material mixture comprising the base film material and the fibre element material is present between a domain of pure base film material and a domain of pure reinforcing fibre element material so as to partially separate the domain of pure reinforcing fibre element material and the domain of pure base film material. The said reinforcing fibre elements are introduced onto the base film to partially wet the surface of the base film, to interlock or interpenetrate with said base film material, and to transfer pure reinforcing fibre element material to the pure base film material. Accordingly, the interface between reinforcing element and base film is comprises direct contact between pure fibre element material and pure base film material and is interrupted by one or more domains of intermixed base film material and fibre element material. In this way, a film with an increased tear resistance and strength can be achieved. Furthermore, the optimised fibre films according to the present invention have a decreased risk of the protrusions becoming detached from the base films compared to prior art films.

It is understood that in the case where the base film and the reinforcing fibre elements are made of the same material, no mixture of different materials is formed. Nevertheless, interpenetration of the polymer chains occurs. The term "pure base film material" means there is less than 10% by weight of the fibre element material in the base film domain, preferably less than 5% by weight, more preferably less than 1% by weight, more preferably less than 0.1% by weight of the reinforcing fibre element material in the domain.

The term "pure fibre element material" means there is less than 10% by weight of the base film material in the base film domain, preferably less than 5% by weight, more preferably less than 1% by weight, more preferably less than 0.1% by weight of the base film material in the domain.

Simple application of heat during bonding of a reinforcing element (such as a strip) onto a base film does not automatically create an intermixed domain sufficient to withstand tear propagation, for example where either the temperature is insufficiently high or the exposure time to the heat is insufficient. By depositing reinforcing fibre or reinforcing fibre-like elements onto the base film which themselves act as heat sources, said reinforcing fibre element material crystallise from the melt upon positioning them onto said base film, thereby ensuring the heat required to achieve a sufficiently strong intermixed domain. Preferably the reinforcing fibre elements are extruded directly onto the base film. The phrase "are extruded directly" means the fibres are placed on the base film within 30 minutes of their extrusion, preferably within 20 minutes, more preferably within 2 minutes, more preferably within 1 minute, more preferably within 10 seconds, more preferably within 5 seconds, more preferably within 1 second. Preferably, the process is continuous.

In one embodiment, the fibre protrusions are annealed onto the base film.

The method for producing the reinforced thermoplastic film of the present invention preferably involves direct extrusion of about 1:1 to 1.5:1 (ratio of width to height) reinforcing fibre elements onto the thin base film, wherein said base film may be extruded or direct extruded. Said reinforcing fibre elements are preferably crystallized onto the base film, preferably maintaining their ratio width to height dimension. The average thickness dimension of said thin base film is preferably less than the average height dimension of said fibre element. At the deposition, a thermoplastic film intermediate is produced which may further follow a cooling procedure, supplying the thermoplastic film of the present invention. In this case said thermoplastic film has similar outer dimensions to said thermoplastic film intermediate. Preferably, the reinforcing fibre elements are pressed shortly after their contact with the base film or most preferably at the contact with the base film such as the ratio width to height of the reinforcing fibre element is altered. In that case the produced thermoplastic film intermediate differs from said thermoplastic film of the present invention regarding the outer dimensions.

In the present invention, placement of the reinforcing fibre element is carried out, with the fibre ideally 1-100° C. above its crystallisation point, more preferably 1-80° C., more preferably 10-60° C., more preferably 20-50° C. The reinforcing fibre itself is a hot element which delivers heat directly to the surface of the base film, resulting in fast, efficient, pointed and controllable heat delivery which is not limited to time contact. Accordingly, intermixing occurs at the interface of reinforcing fibre element and base film, resulting in one or more domains of mixed material comprising reinforcing fibre element material and base film material, which does not extend along the entire length of the interface.

This joining mechanism of the base film and the reinforcing fibre element(s) provides sufficient connection between the reinforcing fibre element(s) and base film, without the need for the large contact areas between the element and film which are normally required for broader reinforcement elements such as strips, bands or tapes. Further local debonding is less likely with fibre protrusions in contrast to strips, as the fibre protrusions do not have the same internal stresses as strips. When strips shrink, they become debonded from the base film, but the fibre protrusions do not.

The joining mechanism of the reinforcing fibre element and the base film has the additional advantage that when interfacial mixing occurs it is not necessary to embed the reinforcing fibre elements into the base film. In the present invention, it is also not necessary to ensure that continuous interfacial contact is present across the cross-section of the element.

The thermoplastic base film is extruded and may be further processed by blown or cast processing. The deposition may be performed on the base film wherein in the base film is preferably in a molten or at least partially molten state or in the solid state.

Pressure may be applied to the reinforcing fibre element after deposition on the base film for better fixation of the fibre protrusion on the base film. In addition, the pressing process may be used to define the cross-section form of the fibre protrusion and the degree of interfacial mixing. This may be achieved by using pressing means for forming the corresponding cross-section. The pressure may be applied by means of a cylinder which can apply pressure to the fibre protrusion at the deposition point. Said cylinder may adjust the height of the fibre protrusion through its fixed position from said base film.

The base film used in this invention is typically substantially a thin film, the average thickness thereof being preferably in the range 4 µm to 50 µm, more preferably 5 µm to 30 µm, more preferably 6 µm to 30 µm, most preferably 6 µm to 25 µm, even more preferably 10 µm to 25 µm. In an embodiment, the thickness of the base film is in the range 15 µm to 45 µm.

In certain embodiments the lateral edges of the film, along the machine direction, of said base film are hemmed.

The reinforcing fibre elements and consequently also the fibre protrusions and/or the base film may contain additives. The use of additives may impart the reinforcing fibre elements, and hence the fibre protrusions also, or the complete reinforced thermoplastic film, with specific properties. The additives in the reinforcing fibre elements and the fibre protrusions and/or in the base film may comprises reinforcing fillers, antioxidants, UV stabilizers, antimicrobial substances, colouring compounds, tacking inhibitors, tacking intensifiers, corrosion inhibitors, humidity trappers, thermal history indicators, anti-static agents, plant growth promoters and/or weed killer agents or mixtures thereof. Suitable volatile corrosion inhibitors may be compounds such as inorganic nitrides, carbonates, molybdates, amines, triazoles or mixtures thereof. In certain embodiments additives include reinforcing fillers of 0-D, 1-D or 2-D shape, or any combinations thereof. In specific embodiments an appropriate compatibilizer accompanies the additive.

In an embodiment, the additives may be present only in the reinforcing fibre elements, and hence in the fibre protrusions.

The additives discussed above may act as barriers to moisture and/or oxygen.

As mentioned above, the reinforced stretch film of the present invention is particularly suitable for unitisation of goods, e.g., packages, bales, silage or plants bearing sharp edges. It is also suitable for use in mulching, for example on arable land to suppress weeds and conserve water in crop production and landscaping. The reinforced stretch film of the present invention is particularly suitable for use as a net replacement in silage applications, for example in wrapping bales.

When wrapping bales, the first step usually involves the wrapping of the bales by the baler with several layers of silage net. Instead of using silage net, however, the bales can be also wrapped with a silage net replacement. The film of the invention can be used as a silage net replacement.

In the second step, bales are completely wrapped with a silage stretch film, by making numerous overlapping turns of film around the bales, in order to provide a barrier against moisture, oxygen, and UV light. The wrapping of bales can be arranged in a variety of patterns to meet particular size and shape requirements and to accommodate a range of bale contents, and these patterns would be known to the person skilled in the art.

The film of the invention can therefore function both as a silage net replacement and as a silage stretch film and is suitable for use for example in baling applications.

Typically, the thickness of a silage film is in the range 15 μm to 45 μm, preferably about 25 μm. The width of a silage film is typically 750 mm or 500 mm. In an exemplary embodiment, when the film of the invention is used as a silage film it has a thickness in the range 15 μm to 45 μm, preferably about 25 μm.

Typically, a silage film undergoes stretching during a wrapping process, and the film may be prestretched by 50% to 80%, preferably by 60% to 70%, and its width could be reduced accordingly i.e., in an exemplary embodiment from around 750 mm to around 620 mm or to around 580 mm.

DETAILED DESCRIPTION OF SPECIFIC EMBODIMENTS

FIG. 1 illustrates a range of different fibre protrusion shapes as assessed from the cross-sections of the reinforcing fibre elements. A range of exemplary shapes adoptable by the fibre protrusion (8) on top of the base film (6) is shown (1, 3, 5), emphasising more severe gradients at the points of contact with the base film compared to the existing materials. The extruded reinforcing fibre element is defined as the fibre element which is placed on the upper surface (4) of the base film in order to improve the tear resistance of the film. The fibre protrusion (8) is defined as the mass projecting from the contact surface, resulting from the placement under pressure of an extruded reinforcing fibre element atop the upper surface (4) of the base film.

Shape 1 is a square-like fibre protrusion with a protrusion angle approaching 90 degrees. Shape 3 is an oval-like fibre protrusion with a protrusion angle of less than 90 degrees. Shape 5 is a pyramid-like fibre protrusion with a protrusion angle of greater than 90 degrees.

The extruded base film (6) is defined as the film used as a base on which the extruded reinforcing fibre element is placed, and acts as the support for the fibre protrusion (8) and the domain of pure fibre element material. The base film (6) has an upper surface (4) and a lower surface (2).

FIG. 2 illustrates how a film according to the invention may be produced (A). An extruded reinforcing fibre element (14) is brought into contact with a base film (6) and compressed into a fibre protrusion on its upper surface (4) to define an interface. In a cross-section through the base film (6), the outer edges of the interface are defined by outer contact edge points C1 (10) and C2 (12). Domains are formed by the pure reinforcing fibre element material (PD) and the pure base film material (BD) and a discontinuous interface exists between them. The outer edges of the interface are defined by contact edge points C1 (10) and C2 (12). Points C1 and C2, together with the discontinuous interface and perpendicular cross sections passing through the film (6) and the lower base film surface (2) form the base film domain.

FIG. 2 shows an embodiment (B), not according to the invention, wherein a domain comprises continuous interfacial mixing (16) between the pure fibre protrusion (8) and the pure base film, formed by mixing between the reinforcing fibre element material and the base film material.

FIG. 2 also illustrates an embodiment according to the present invention, wherein there is non-continuous interfacial mixing (C) across the interface formed between the domain of pure base film material and the domain of pure reinforcing fibre element material. The fibre protrusion (8) is defined as the element material above the contact plane (22) having a maximum width $W_{prot\_max}$ (18) and a maximum height $H_{prot\_max}$ (20). The contact plane (22) is the plane formed between the outer edge contact points C1 (10) and C2 (12) underneath a fibre protrusion (8). There is a discontinuous interface comprising some direct interaction between the pure base film material and pure reinforcing fibre element material, interrupted by several domains of intermixed base film material and reinforcing fibre element material.

FIG. 2C illustrates protrusion angles PA1 and PA2. The protrusion angle is in the range 0 degrees to 180 degrees and is preferably in the range 10 degrees to 170 degrees, more preferably in the range 40 degrees to 140 degrees and most preferably in the range 60 degrees to 120 degrees. In a particularly preferred embodiment, the fibre protrusion angle is around 90 degrees.

Figure 3A:
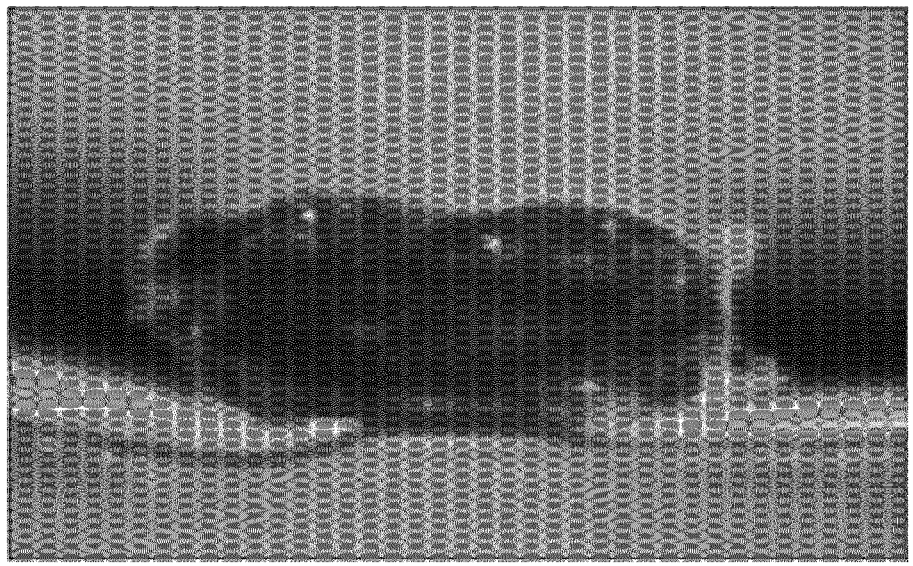
FIG. 3A shows three fibre protrusions of reinforced stretch films produced under different processing conditions.
Figure 3A:
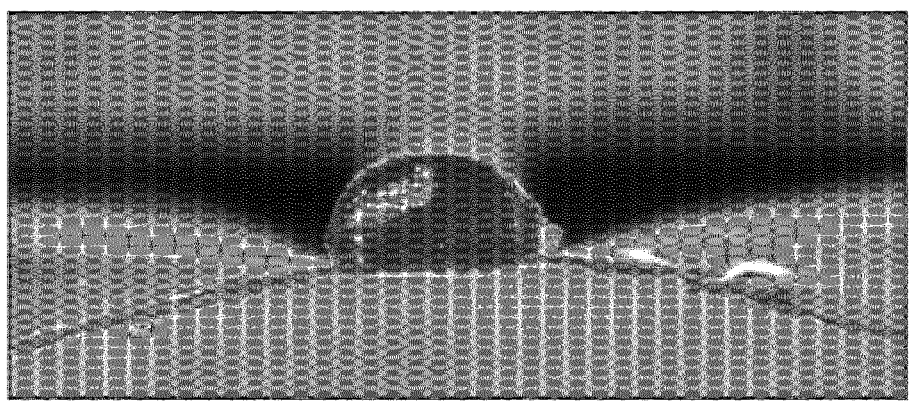
Figure 3A:
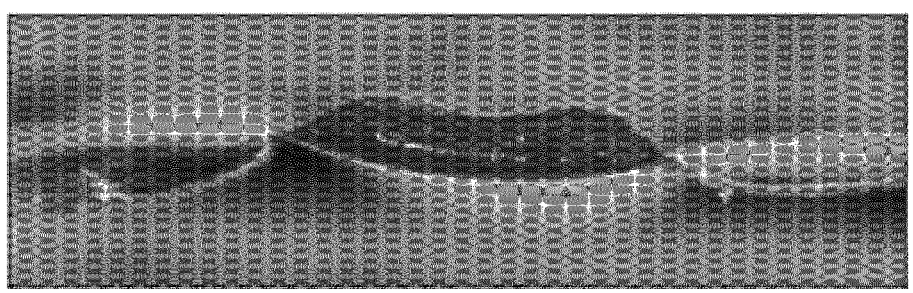

FIG. 3A shows three fibre protrusions on base films produced under different processing conditions, namely under low pressure (used to produce fibre protrusions according to the present invention), intermediate pressure and high pressure.

Figure 3B:
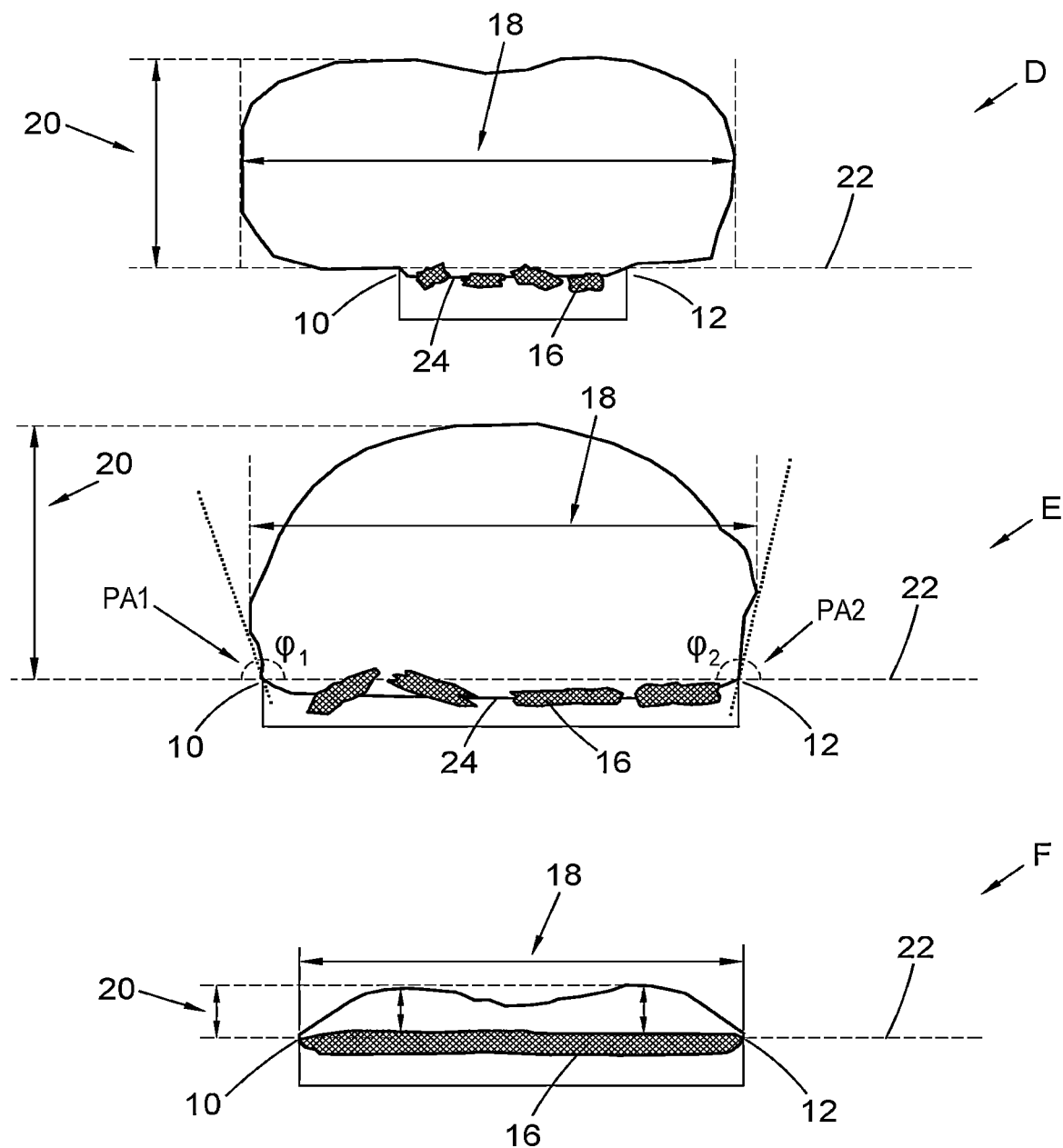
FIG. 3B shows schematic representations of three fibre protrusions of reinforced stretch films produced under different processing conditions, emphasising the physical parameters relevant to the present invention and the domain types present at the interface.

FIG. 3B shows schematic representations of three fibre protrusions on base films produced under different processing conditions, namely under low pressure (D) (used to produce fibre protrusions according to the present invention), intermediate pressure (E) and high pressure (F).

The maximum width of the fibre protrusion (18), $W_{prot\_max}$, is defined as the maximum width of the fibre protrusion once formed extending parallel to the contact plane.

The maximum height of the fibre protrusion (20), $H_{prot\_max}$, is defined as the maximum height of the fibre protrusion once formed extending orthogonally from the contact plane (22) from the highest point of the fibre protrusion.

The outer edge contact points C1 (10) and C2 (12) are defined as the two outermost points of the interface formed between the domain of pure base film material and the domain of pure reinforcing fibre element material, where the reinforcing fibre element makes contact with the surface of the base film.

The contact plane (22) is defined as the plane formed between the outer edge contact points C1 (10) and C2 (12) extending laterally relative to the fibre protrusion and is used to calculate and define the protrusion angles, maximum height, and maximum width.

The interface (24) is defined as the interface formed between the domain of pure base film material and the domain of pure reinforcing fibre element material forming the fibre protrusion, comprising the locations where the extruded pure reinforcing fibre element material and the extruded pure base film material meet and interact.

The two protrusion angles (PA1 and PA2) are defined as the supplementary angles of $\varphi_1$ and $\varphi_2$ (i.e., the angles added to $\varphi_1$ and $\varphi_2$ respectively to equal 180°).

The angles $\varphi_1$ and $\varphi_2$ are defined as the angles formed between the tangents drawn between the points of greatest horizontal extension on either side of the fibre protrusion and C1 (10) and C2 (12), wherein each tangent crosses the contact plane (22) at either C1 (10) or C2 (12) and each tangent touches the horizontal surface of the fibre protrusion only once.

Figure 4:
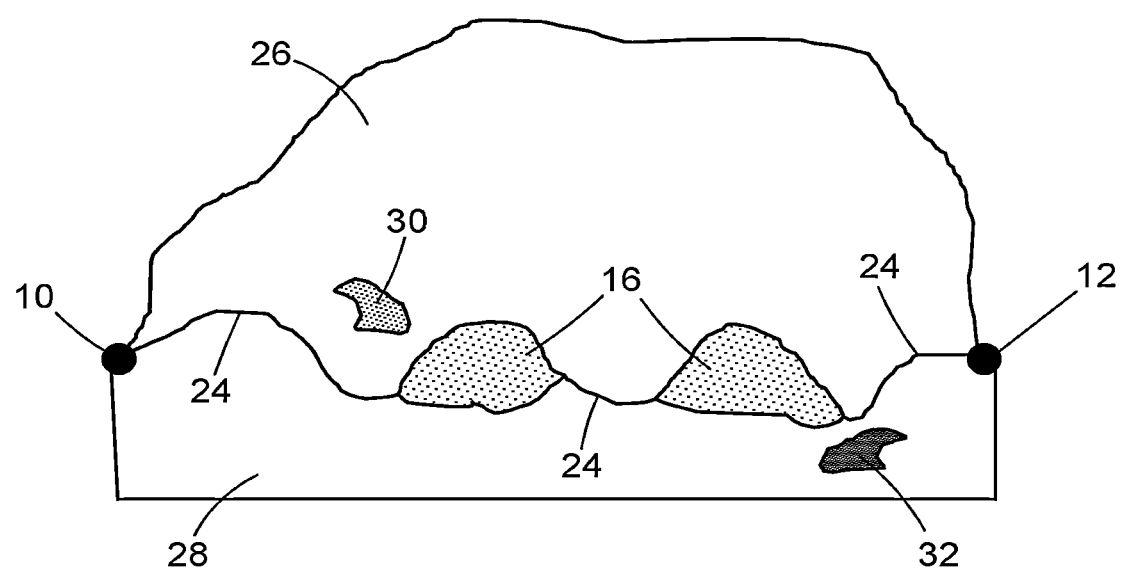
FIG. 4 shows an analysis of the domains of material present along and around the interface formed between the fibre protrusion domain and the base film domain.

FIG. 4 shows a detailed view of a fibre protrusion and its domains. The interface (24) is defined as the interface formed between the base film (28) and fibre protrusion (26) domains, comprising all the points where the extruded pure fibre element material and the pure base film material meet and interact, interrupted by the intermixed domains (16).

The protrusion domain, PD, (26) is the region of protrusion comprising pure reinforcing fibre element material (no base film material).

The base film domain, BD (28) is of the region of pure base film material, which may be found underneath the PD.

The interface is interrupted by one or more domains (16), which are regions of intermixed material of base film material and reinforcing fibre element material and are otherwise referred to as "ID". The interface between the PD and BD is partially interrupted by one or more IDs. The perimeter of each ID (16) forms two new interfaces, one between the BD and ID and another between the PD and ID, which produce interfacial interactions between ID and BD and ID and PD (leading to three-part PD-ID-BD interactions).

There may also be regions of intermixed material of base film material and reinforcing fibre element material outside of the interface formed between the BD and the PD. For instance, an ID may be fully included in the PD (30) and/or BD (32), thus its perimeter may be fully surrounded either by PD (26) or BD (28), respectively. These instances of intermixed domains, being enclosed wholly by pure reinforcing fibre element material (30) or pure base film material (32), do not contribute to interactions at the interface between the pure fibre element material and the pure base film material. These regions of intermixed material enclosed wholly in either base film (32) or element material (30) may also be referred to as inclusions.

The cross-sectional area is defined by the plane perpendicular to the contact plane which passes through C1 (10) and C2 (12) and crosses the base film. It is the area viewable inside the reinforcing fibre element if one looks along the length of a fibre protrusion.

Figure 5A:
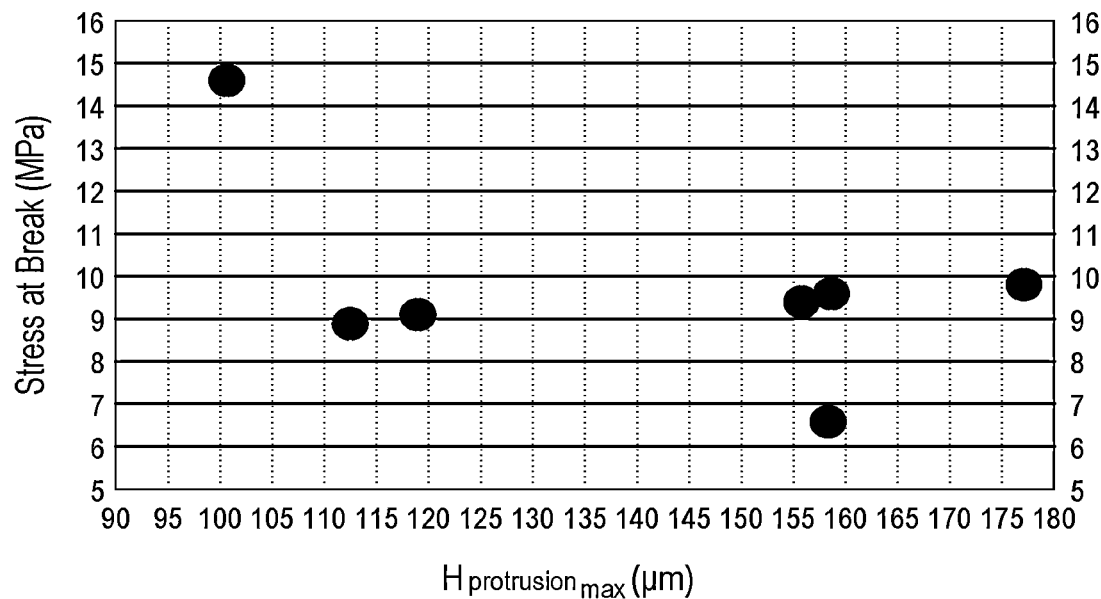
FIGS. 5A-5C show the physical and mechanical properties of reinforced fibre films as a function of maximum fibre protrusion height, $H_{prot\_max}$.
Figure 5B:
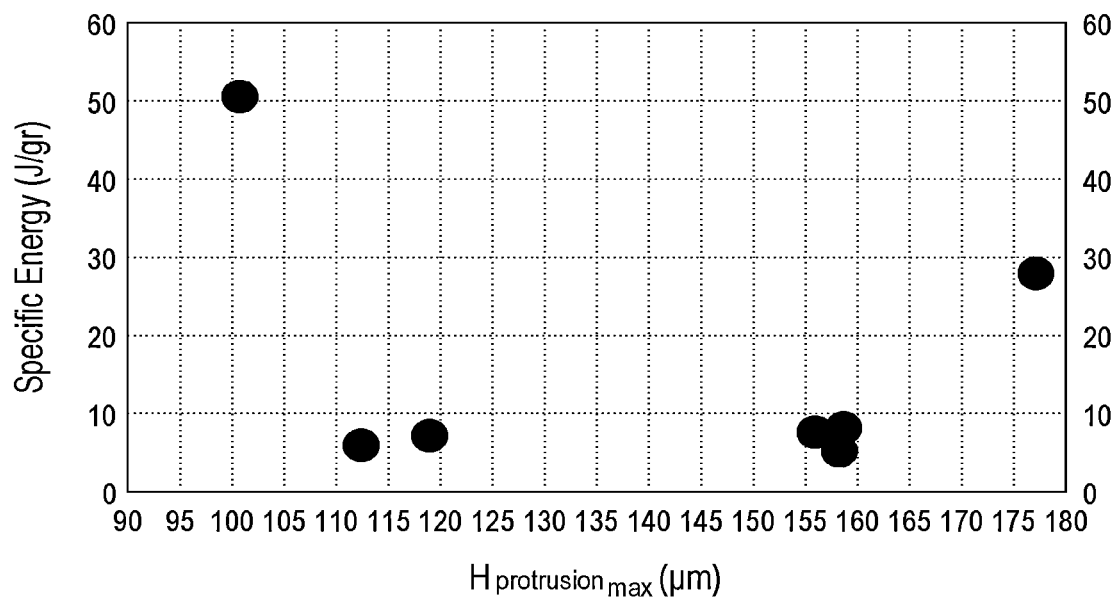
Figure 5C:
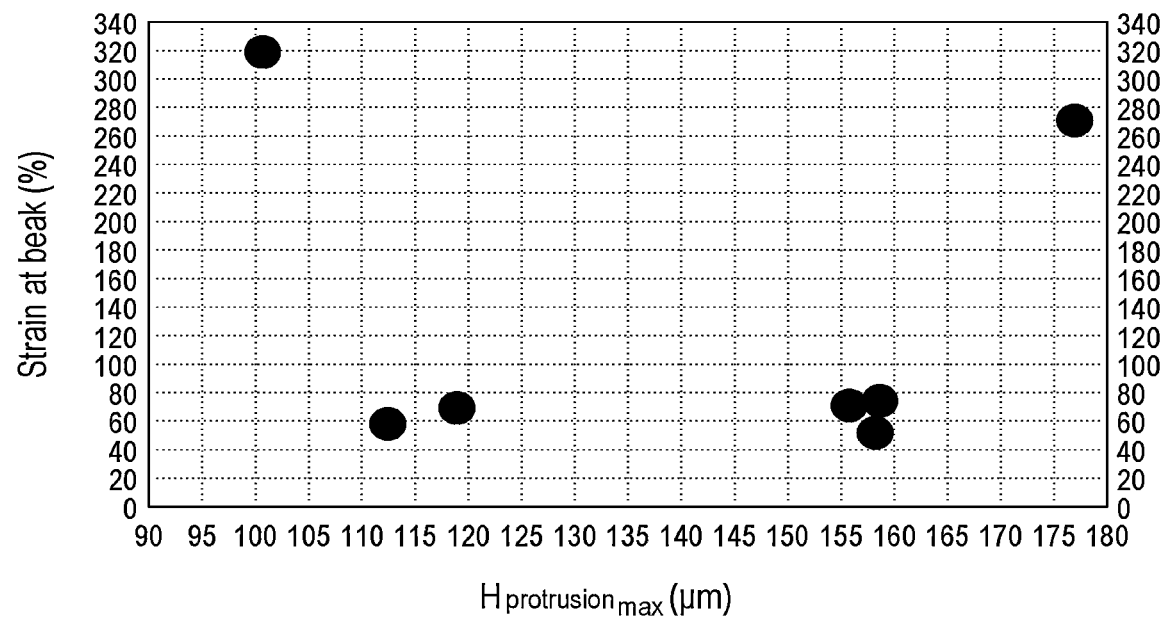

FIGS. 5A-C shows the stress at break, specific energy and strain at break of the reinforced film as a function of fibre protrusion maximum height. It is apparent that optimal properties are obtained at either extreme of the x-axis on the graph. Some reinforced thermoplastic films of the present invention can be viewed as lying on the right-hand side of the x-axis, i.e., as having greater fibre protrusion maximum heights, compared to the prior art.

Figure 6A:
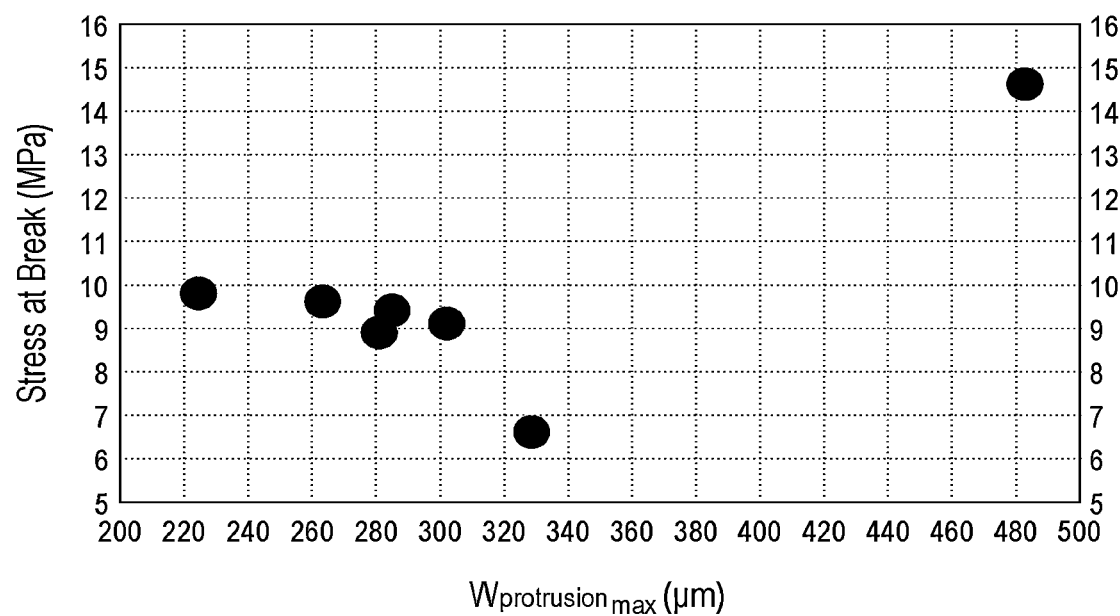
FIGS. 6A-6C show the physical and mechanical properties of reinforced fibre films as a function of maximum fibre protrusion width, $W_{prot\_max}$.
Figure 6B:
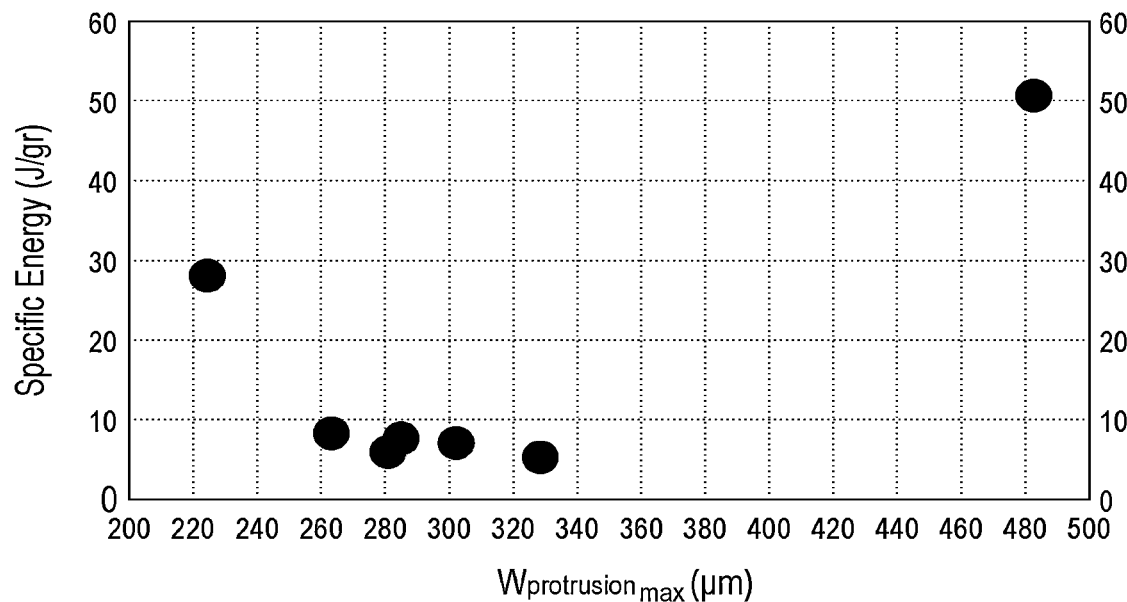
Figure 6C:
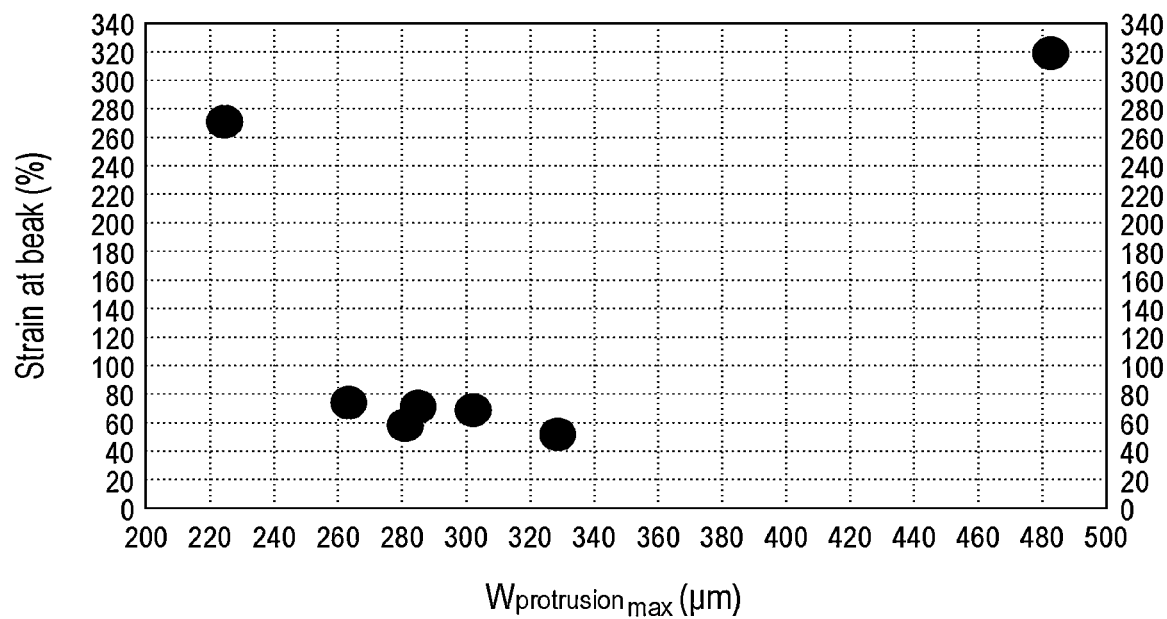

FIG. 6A-C shows a similar distribution of stress at break, specific energy, and strain at break of the reinforced film but as a function of fibre protrusion maximum width, and essentially mirrors the distribution in FIG. 5. In this instance, some reinforced thermoplastic films of the present invention can be viewed as lying towards the left-hand side of the x-axis, i.e., have smaller maximum widths compared to the prior art.

EXAMPLES

The following non-limiting Examples demonstrate some reinforced stretch films of the present invention. Each specimen of reinforced stretch film may be provided having thereon one longitudinal fibre protrusion. Alternatively, a wider reinforced stretch film with many fibre protrusions is produced and the specimen is cut out of this film.

The protrusion angles, the maximum height and maximum width of the fibre protrusion can be determined by measurement with a suitable microscope.

Example 1

A reinforced fibre film of the present invention is produced by placing a reinforcing fibre element of diameter 280 μm on a base film having 500 mm width and thickness 14 μm. The base film and the fibre reinforcing elements have the same density, 0.920 g/cm³. The 15 mm width sample of said film has one continuous fibre protrusion parallel to the tensile stress direction and situated as close as possible to the central portion of the sample width. The weight of the samples for a length equal to the grip to grip area (60 mm) is 15 mg. The fibre protrusion has maximum width, $W_{prot\_max}$=225 μm and maximum height, $H_{prot\_max}$=177 μm and the ratio of $H_{prot\_max}$ over $W_{prot\_max}$ is 0.79. The protrusion angles PA1 and PA2 are 51 degrees and 60 degrees, respectively.

Example 2

A reinforced fibre film of the present invention is produced by placing a reinforcing fibre element of diameter 311 μm on a base film having 500 mm width and thickness 15 μm. The base film and the fibre reinforcing elements have the same density, 0.920 g/cm³. The 15 mm width sample of said film has one continuous fibre protrusion parallel to the surface of the film in the machine direction close as possible to the central portion of the sample width. The weight of the samples for a length equal to the grip to grip area (60 mm) is 17 mg. The fibre protrusion has maximum width, $W_{prot\_max}$=263 μm and maximum height, $H_{prot\_max}$=158 μm and the ratio of $H_{prot\_max}$ over $W_{prot\_max}$ is 0.60. The protrusion angles PA1 and PA2 are 82 degrees and 80 degrees, respectively.

Example 3

A reinforced fibre film of the present invention is produced by placing a reinforcing fibre element of diameter 311 μm on a base film having 500 mm width and thickness 15 μm. The base film and the fibre reinforcing elements have the same density, 0.920 g/cm³. The 15 mm width sample of said film has one parallel and continuous fibre protrusion in the machine direction close as possible to the central portion of the sample width. The weight of the samples for a length equal to the grip to grip area is (60 mm) 17 mg. The fibre protrusion has maximum width, $W_{prot\_max}$=329 µm and maximum average height, $H_{prot\_max}$=158 µm and the ratio of $H_{prot\_max}$ over $W_{prot\_max}$ is 0.48. The protrusion angles PA1 and PA2 are 99 degrees and 108 degrees, respectively.

Example 4

A reinforced fibre film of the present invention is produced by placing a reinforcing fibre element of diameter 286 µm on a base film having 500 mm width and thickness 16 µm. The base film and the fibre reinforcing elements have the same density, 0.920 g/cm³. The 15 mm width sample of said film has one parallel and continuous fibre protrusion in the machine direction close as possible to the central portion of the sample width. The weight of the samples for a length equal to the grip to grip area is (60 mm) 17 mg. The fibre protrusion has maximum width, $W_{prot\_max}$=285 µm and maximum height, $H_{prot\_max}$=156 µm and the ratio of $H_{prot\_max}$ over $W_{prot\_max}$ is 0.55. The protrusion angles PA1 and PA2 are 73 degrees and 72 degrees, respectively.

equal to the grip to grip area is (60 mm) 15 mg. The fibre protrusion has maximum width, $W_{prot\_max}$=281 µm and maximum height, $H_{prot\_max}$=112 µm and the ratio of $H_{prot\_max}$ over $W_{prot\_max}$ is 0.40. The protrusion angles PA1 and PA2 are 102 degrees and 98 degrees, respectively.

Example 7

A reinforced fibre film of the present invention is produced by placing a reinforcing fibre element of average diameter 291 µm on a base film having 500 mm width and thickness 15 µm. The base film and the fibre reinforcing elements have the same density, 0.920 g/cm³. The 15 mm width sample of said film has one parallel and continuous fibre protrusion in the machine direction close as possible to the central portion of the sample width. The weight of the sample for a length equal to the grip to grip area is (60 mm) 16 mg. The fibre protrusion has maximum width, $W_{prot\_max}$=483 µm and maximum height, $H_{prot\_max}$=101 µm and the ratio of $H_{prot\_max}$ over $W_{prot\_max}$ is 0.21. The protrusion angles PA1 and PA2 are 149 degrees and 142 degrees, respectively.

The above inventive reinforced stretch film examples of the present invention are compared in Table 1.

TABLE 1

| | Parameters of the Examples and their physical and mechanical properties | | | | | | | | |
|---|---|---|---|---|---|---|---|---|---|
| Example No. | Reinforcing Fibre Element diameter (µm) | $H_{Protr.max}$ (µm) | $W_{Protr.max}$ (µm) | PA1 (°) | PA2 (°) | Sample weight ×10⁻³ (g) | Stress at break (MPa) | Strain at break (%) | Specific Energy (J/g) |
| 1 | 280 | 177 | 225 | 51 | 60 | 15 | 9.8 | 271 | 28.0 |
| 2 | 311 | 159 | 263 | 82 | 80 | 17 | 9.6 | 74 | 8.2 |
| 3 | 311 | 158 | 329 | 99 | 108 | 17 | 6.6 | 52 | 5.3 |
| 4 | 286 | 156 | 285 | 73 | 72 | 17 | 9.4 | 71 | 7.6 |
| 5 | 250 | 119 | 302 | 67 | 107 | 14 | 9.1 | 69 | 7.1 |
| 6 | 259 | 112 | 281 | 102 | 98 | 15 | 8.9 | 58 | 6.0 |
| 7 | 291 | 101 | 483 | 149 | 142 | 16 | 14.6 | 319 | 50.6 |

Example 5

A reinforced fibre film of the present invention is produced by placing a reinforcing fibre element of diameter 250 µm on a base film having 500 mm width and thickness 14 µm. The base film and the fibre reinforcing elements have the same density, 0.920 g/cm³. The 15 mm width sample of said film has one parallel and continuous fibre protrusion in the machine direction close as possible to the central portion of the sample width. The weight of the sample for a length equal to the grip to grip area is (60 mm) 14 mg. The fibre protrusion has maximum width, $W_{prot\_max}$=302 µm and maximum average height, $H_{prot\_max}$=119 µm and the ratio of $H_{prot\_max}$ over $W_{prot\_max}$ is 0.39. The protrusion angles PA1 and PA2 are 67 degrees and 107 degrees, respectively.

Example 6

A reinforced fibre film of the present invention is produced by placing a reinforcing fibre element of diameter 259 µm on a base film having 500 mm width and thickness 14 µm. The base film and the fibre reinforcing elements have the same density, 0.920 g/cm³. The 15 mm width sample of said film has one parallel and continuous fibre protrusion in the machine direction close as possible to the central portion of the sample width. The weight of the sample for a length Data Analysis The data produced indicate that the relative dimensions (in particular the maximum height of fibre protrusion) have a role in shaping the resulting properties of the reinforced thermoplastic film. Increasing the maximum height of the fibre protrusion increases the barrier against tearing, while at the same time the existence of one or more discrete intermixed domains underneath the fibre protrusion provide a structured support inhibiting tear propagation.

On the other hand, when decreasing the maximum height of the fibre protrusion and thereby also increasing the area occupied by intermixed domains underneath the fibre protrusion and along the interface formed between the base film domain and the fibre protrusion domain, a critical maximum height is reached beyond which the physical and mechanical properties (e.g., energy to break, elongation and strength) improve again.

The invention claimed is:
1. A reinforced thermoplastic film comprising:
   a base film wherein the base film comprises a stretchable polyolefin material comprising one or more layers; and
   a plurality of extruded reinforcing fibre elements;
   wherein the extruded reinforcing fibre elements are located on at least one surface of the base film;
   wherein the extruded reinforcing fibre elements form fibre protrusions relative to a surface plane of the base film;

wherein at the location where each reinforcing fibre element is provided on the base film, an interface is formed comprising direct interactions between a base film domain and a protrusion domain;

wherein the base film domain is a domain of a pure base film material and the protrusion domain is a domain of a pure reinforcing fibre element material;

wherein the interface between the base film domain and the protrusion domain is interrupted by two or more discrete intermixed domains; wherein the intermixed domains comprise a material mixture comprising the base film material and the reinforcing fibre element material and;

wherein the two or more intermixed domains partially interrupt the direct interactions at the interface between the base film domain and the protrusion domain;

wherein the two or more intermixed domains have interfaces and direct interactions with the base film and protrusion domains; and wherein an average thickness of the base film is less than an average thickness of the fibre protrusion.

2. The reinforced thermoplastic film according to claim 1, wherein there are at least three reinforcing fibre elements extruded on the base film.

3. The reinforced thermoplastic film according to claim 1, wherein a ratio of a maximum height to a maximum width of the fibre protrusions is more than 0.1.

4. The reinforced thermoplastic film according to claim 1, wherein the average thickness of the base film is in the range of 4 µm to 50 µm.

5. The reinforced thermoplastic film according to claim 1, wherein the fibre protrusions have a maximum height of more than 60 µm.

6. The reinforced thermoplastic film according to claim 1, wherein the fibre protrusions have a maximum width of less than 1000 µm.

7. The reinforced thermoplastic film according to claim 1, wherein a contact width of the fibre protrusions is less than 1100 µm.

8. The reinforced thermoplastic film according to claim 1, wherein an average diameter of the plurality of reinforcing fibre elements is between 30 µm and 1000 µm.

9. The reinforced thermoplastic film according to claim 1, which has a weight in the range 4.0 g/m$^2$ to 100.0 g/m$^2$.

10. The reinforced thermoplastic film according to claim 1, wherein fibre protrusion angles PA1 and PA2 are from 10 degrees to 170 degrees.

11. The reinforced thermoplastic film according to claim 1, wherein a difference between two fibre protrusion angles PA1 and PA2 is less than 90 degrees.

12. The reinforced thermoplastic film according to claim 1, wherein the interface between the domain of the pure base film material and the domain of the pure fibre element material is partially interrupted by the two or more domains of the material mixture towards an interior of the fibre protrusion.

13. The reinforced thermoplastic film according to claim 1, wherein the two or more intermixed domains are not located at an outer perimeter of the fibre protrusions.

14. The reinforced thermoplastic film according to claim 1, wherein a ratio of an average maximum height to an average maximum length of the fibre protrusions is in the range of 1:500 to 1:10000000.

15. The reinforced thermoplastic film according to claim 1, wherein the fibre protrusions cover less than 51% of a surface area of the film.

16. The reinforced thermoplastic film according to claim 1, wherein a maximum average diameter of the reinforcing fibre elements varies by no more than 75% from the minimum average diameter of the fibre elements.

17. The reinforced thermoplastic film according to claim 1, wherein the interface between the domain of the pure base film material and the domain of the pure fibre element material is curved.

18. The reinforced thermoplastic film according to claim 1, wherein the base film and the plurality of reinforcing fibre elements are pre-stretched by at least 10%.

19. The reinforced thermoplastic film according to claim 1, wherein the base film is perforated.

20. The reinforced thermoplastic film according to claim 1, wherein lateral edges of the film, along the machine direction, are hemmed.

21. The reinforced thermoplastic film of claim 1, wherein the reinforced thermoplastic film is provided on a roll.

22. A method of producing a reinforced thermoplastic film comprising:
(i) extruding a base film comprising a stretchable polyolefin material comprising one or more layers;
(ii) extruding a plurality of reinforcing fibre elements;
(iii) applying the plurality of reinforcing fibre elements to at least one side of the base film; and
(iv) bonding the reinforcing fibre elements to the base film;
wherein the extruded reinforcing fibre elements form fibre protrusions relative to a surface plane of the base film;
wherein at the location where each reinforcing fibre element is provided on the base film, an interface is formed comprising direct interactions between a base film domain and a protrusion domain;
wherein the base film domain is a domain of a pure base film material and the protrusion domain is a domain of a pure reinforcing fibre element material;
wherein the interface between the base film domain and the protrusion domain is interrupted by two or more discrete intermixed domains; wherein the intermixed domains comprise a material mixture comprising the base film material and the reinforcing fibre element material; and
wherein the two or more intermixed domains partially interrupt the direct interactions at the interface between the base film domain and the protrusion domain;
wherein the two or more intermixed domains have interfaces and direct interactions with the base film and protrusion domains; and
wherein an average thickness of the base film is less than an average thickness of the fibre protrusion.

23. A method according to claim 22, wherein the reinforcing fibre elements are bonded to the base film by heat fusion and/or wherein the bonding step comprises applying pressure to the fibre elements.

24. A reinforced thermoplastic film obtainable by the steps comprising:
(i) extruding a base film comprising a stretchable polyolefin material comprising one or more layers;
(ii) extruding a plurality of reinforcing fibre elements;
iii) applying the plurality of reinforcing fibre elements to at least one side of the base film; and
(iv) bonding the reinforcing fibre elements to the base film;
wherein the extruded reinforcing fibre elements form fibre protrusions relative to a surface plane of the base film;
wherein at the location where each reinforcing fibre element is provided on the base film, an interface is formed comprising direct interactions between a base film domain and a protrusion domain;

wherein the base film domain is a domain of a pure base film material and the protrusion domain is a domain of a pure reinforcing fibre element material;

wherein the interface between the base film domain and the protrusion domain is interrupted by two or more discrete intermixed domains; wherein the intermixed domains comprise a material mixture comprising the base film material and the reinforcing fibre element material, and wherein the two or more intermixed domains partially interrupt the direct interactions at the interface between the base film domain and the protrusion domain;

wherein the two or more intermixed domains have interfaces and direct interactions with the base film and protrusion domains;

and wherein an average thickness of the base film is less than an average thickness of the fibre protrusion.

\* \* \* \* \*